(No Model.)
C. J. HIRLIMANN.
ELECTRIC BATTERY.
No. 351,602. Patented Oct. 26, 1886.
FIG. I.
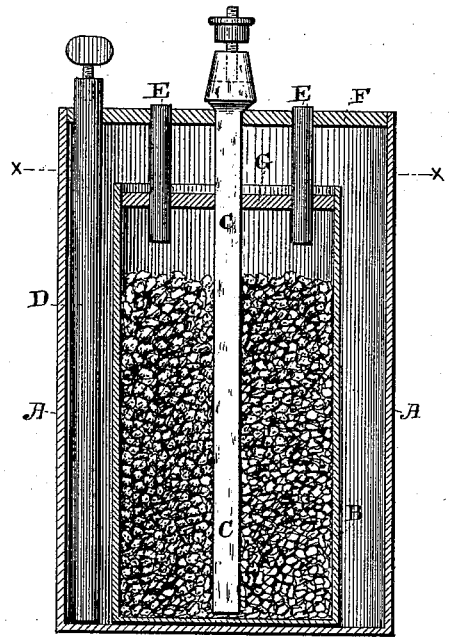
FIG. II.
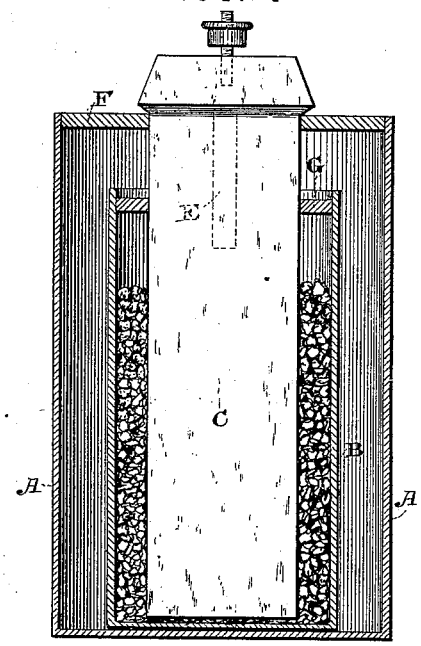
FIG. III.
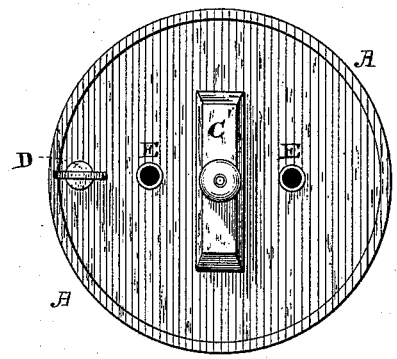
FIG. IV.
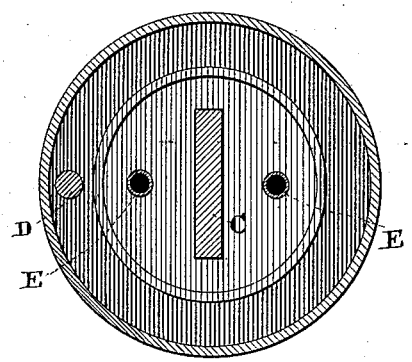
Attest:
Geo. T. Smallwood.
F. A. S. Hopkins
Inventor:
Charles J. Hirlimann
By Knight Bros.
Attys

UNITED STATES PATENT OFFICE.

CHARLES J. HIRLIMANN, OF NEW YORK, N. Y.

ELECTRIC BATTERY.

SPECIFICATION forming part of Letters Patent No. 351,602, dated October 26, 1886.

Application filed April 7, 1886. Serial No. 198,081. (No model.)

*To all whom it may concern:*

Be it known that I, CHARLES J. HIRLIMANN, a citizen of the United States, residing at New York, in the State of New York, have invented a new and useful Improvement in Electric Batteries, of which the following is a specification.

My invention relates particularly to those non-acid batteries in which the porous cup, and sometimes the outer jar, are tightly sealed to prevent the spreading of the salt and keep the poles electrically isolated. With such jars, when peroxide of manganese is used in the porous cup, it is necessary that air should be admitted to the latter in some manner.

In order that my invention may be fully understood, I will proceed to describe it with reference to the accompanying drawings, and point out specifically in the claims the novel features.

In said drawings, Figures I and II are vertical sectional views of a battery-jar embodying my invention, the sections being taken in planes at right angles to each other. Fig. III is a plan view of the jar or element; and Fig. IV is a section on the line X X, Fig. I.

A may represent an ordinary cylindrical jar containing the battery-fluid. B is the porous cup; C, the carbon plate placed therein, and D the zinc pole placed in the jar A.

The jar A is covered by a lid, F, which provides bearing for the zinc pole D and the upper ends of two tubes, E E, of brass or other proper material, which project down through the lid or sealing, G, of the porous cup. The inner lid, G, is sealed with wax in such manner that the only access of air to the porous cup is through the tubes E E.

By an arrangement such as above described all the beneficial effects resulting from a tight covering of both the porous cup and the outer jar are secured, and at the same time air is freely admitted to the interior of the porous cup.

I am aware that it is not new to provide openings in the sealing of the porous cup. Such device is shown in the ordinary Leclanché battery. As before made, however, such openings have been found to be imperfect, by reason of the fact that when in use they are liable to become clogged or completely closed by the heat or simply by the action of the atmosphere. My brass tubes, projecting through the sealing of the porous cup and sufficiently above and below the same, insure the maintenance of connection between the outside air and the porous cup.

It will be readily seen that the continuance of the tubes beyond the covers of the jar and porous cup prevents the likelihood of the closing of the tubes by the creeping of the salt thereon.

It is important that brass or similar refractory tubes should be employed, because, by reason of their superior gravity, they do not rise out of the melted cement when the latter is used as a sealing for the porous cup, and there is no danger of their breakage by the hot cement.

Having thus described my invention, the following is what I claim as new therein and desire to secure by Letters Patent:

1. In an electric battery, the combination of an outer jar containing the battery-fluid, a porous cup, and negative and positive poles extending into said cup and jar, a sealed lid on the porous cup, and refractory tubes projecting through said lid some distance into the porous cup at their lower ends and above the fluid in the outer jar at their upper ends, substantially as set forth.

2. In an electric battery, the combination of an outer jar and a porous cup therein, both jar and cup having covers, substantially as described, electrodes placed in said jar and cup, and refractory tubes extending through the covers of both jar and cup and projecting some distance into the latter, substantially as set forth.

In testimony whereof I have hereunto set my hand this 1st day of April, 1886.

CHARLES J. HIRLIMANN.

In presence of—
R. T. VAN BOSKERCK,
CHARLES G. COE.